United States Patent [19]

Hagedorn et al.

[11] 4,396,410
[45] Aug. 2, 1983

[54] METHOD OF AND APPARATUS FOR PRESS BENDING GLASS SHEETS

[75] Inventors: Floyd T. Hagedorn, Oregon; Robert G. Revells, Toledo, both of Ohio

[73] Assignee: Libbey-Owens-Ford Company, Toledo, Ohio

[21] Appl. No.: 292,239

[22] Filed: Aug. 12, 1981

[51] Int. Cl.³ ............................................. C03B 23/03
[52] U.S. Cl. ...................................... 65/106; 65/273; 65/290
[58] Field of Search ................. 65/104, 106, 268, 273, 65/290

[56] References Cited

U.S. PATENT DOCUMENTS

| 3,077,753 | 2/1963 | Dammers | 65/106 |
| 3,677,731 | 7/1972 | Martin | 65/106 X |
| 4,318,728 | 3/1982 | Claassen | 65/106 |

*Primary Examiner*—Arthur D. Kellogg
*Attorney, Agent, or Firm*—Collins, Oberlin & Darr

[57] ABSTRACT

A method of and apparatus for press bending glass sheets into nonsymmetrical shapes including opposed press rings having complementary nonsymmetrical shaping surfaces, one of said press rings having a displaceable segment forming a part of the shaping rail to clamp the sheet against the opposed shaping rail and avoid drifting of the sheet relative to said shaping rails.

12 Claims, 7 Drawing Figures

METHOD OF AND APPARATUS FOR PRESS BENDING GLASS SHEETS

BACKGROUND OF THE INVENTION

The present invention relates generally to the production of bent glass sheets and, more particularly, to an improved method of and apparatus for bending glass sheets having specially configured curvatures.

Bent sheets are commonly used as glazing closures in vehicles such as automobiles and the like. In one commercial production of curved or bent glass sheets in large quantities in a mass production facility, the sheets are supported in a horizontal plane and advanced on externally driven roll-type conveyors in a horizontal path successively through a heating area, a bending area and a heat treating area for annealing or tempering the bent sheets.

The heated glass sheets are advanced from the heating furnace to the bending area and accurately located therein between complemental upper and lower glass shaping press members by the engagement of the leading edges thereof with locating stops positioned in the path of movement of the advancing sheets. When properly oriented, the sheet is engaged along its marginal edge portions by the lower press member and lifted from the conveyor rolls for pressing between the complemental shaping surfaces of the opposed press members. The lower or female press member is generally of a ring-type construction having a shaping rail provided with a surface which engages only the marginal portions of the sheet, the rail being segmented in order to clear the conveyor rolls when moved upwardly therebetween. While these outline, ring-type press members have admirably served the purposes for which they were designed in bending glass sheets of conventional curvatures, they are not completely satisfactory in shaping glass sheets of nonsymmetrical shapes, such as those required for utility as sunroofs in vehicle roof tops or for certain specially configured windshields, for example. The reason for this is that the sheet tends to drift for slip slightly relative to the nonsymmetrical shaping surface of the lower press ring as it is being lifted thereby, as well as when making contact with the nonsymmetrical shaping surface of the upper press ring. Generally, the sheet tends to slip or creep toward the side or edge having the least pronounced curvature, causing the final curvature imparted to the sheet to deviate somewhat from the intended curvature and resulting in an improperly shaped finished product.

SUMMARY OF THE INVENTION

Accordingly, it is a primary object of the present invention to overcome the above-noted shortcomings by providing an improved method of and apparatus for press bending glass sheets into nonsymmetrical shapes.

It is another object of this invention to provide in the foregoing method and apparatus, an expedient for preventing glass sheet slippage in a direction normal to the direction of movement of the opposed press members when approaching each other to effect shaping of nonsymmetrical glass sheets.

It is still another object of the present invention to provide in the foregoing bending apparatus means for clamping the glass sheet against the female shaping member immediately after the sheet has cleared the supporting conveyor rolls to avoid any lateral glass slippage or shifting relative to the press shaping members.

It is a further object of this invention to provide the male member with a displaceable shaping rail segment clampingly engageable with the glass sheet prior to engagement of the sheet with the major portion of the male shaping surface.

The foregoing and other objects, advantages and characterizing features of the present invention will become clearly apparent from the ensuing detailed description of an illustrated embodiment thereof, taken together with the accompanying drawings, wherein like reference numerals denote like parts throughout the various views.

DESCRIPTION OF THE PREFERRED EMBODIMENT

Figure 1:
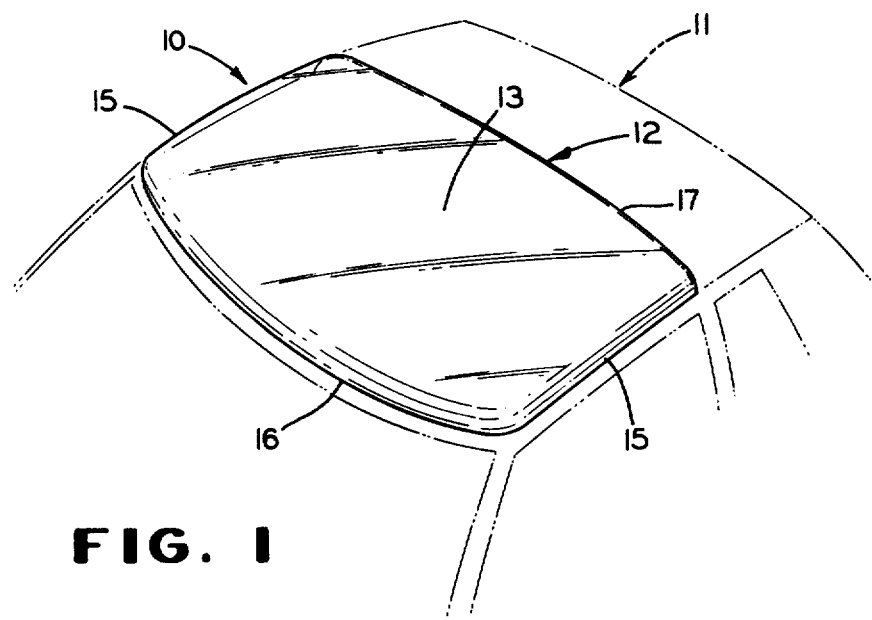
FIG. 1 is a fragmentary, perspective view of an automobile showing a glazing closure installed in the roof thereof and produced in accordance with this invention.

Referring now in detail to the drawings, there is shown in FIG. 1 a rooflite 10, sometimes referred to as a "sunroof", bent to the desired configuration in accordance with the method and apparatus of this invention and shown installed in the roof of an automobile 11 of recent design. The rooflite 10 is comprised of a large, single, curved glass sheet 12 having a body portion 13 formed with convex curvatures along both the longitudinal and transverse axes of the sheet. The body portion 13 terminates in opposite down-turned side marginal edge portions 15 that extend into the vehicle side surfaces, a down-turned front marginal edge portion 16 that extends into the windshield frame surface, and a substantially flat rear marginal edge portion 17 that merges or blends into the roof line of the vehicle. The specific monolithic rooflite 10 shown is exemplary only, it being understood that the principles of this invention are equally applicable to the formation of any large, nonsymmetrically curved glazing closure of either one or more multiple layered sheets of glass, such as laminated windshields for example.

Figure 2:
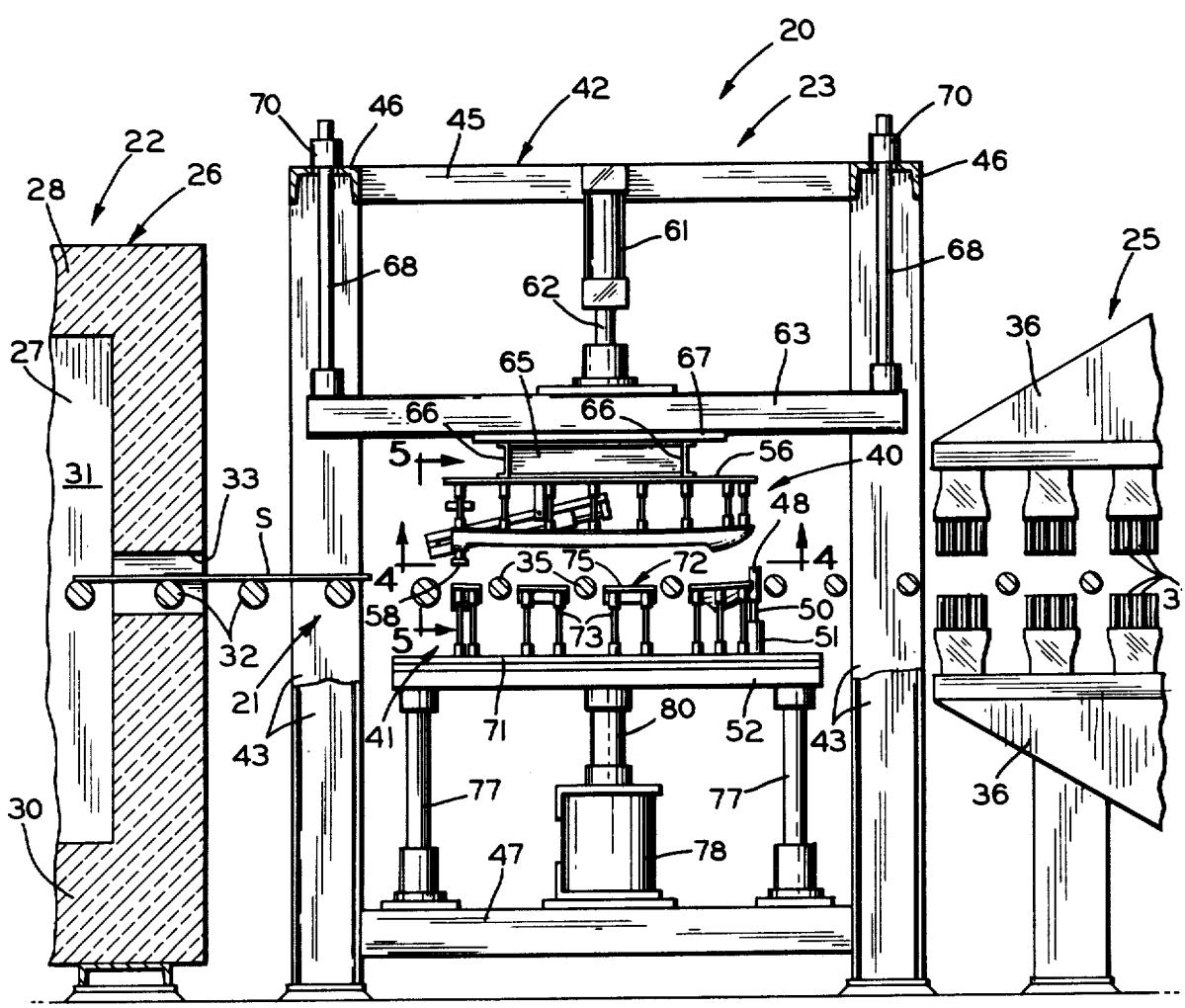
FIG. 2 is a side elevational view, partly in section, of a press bending apparatus embodying the novel features of this invention, and shown interposed between a heating station and a tempering station.

Referring now in detail to the illustrative embodiment depicted in the drawings for carrying out this invention, there is shown in FIG. 2 a bending and tempering apparatus, comprehensively designated 20, for producing bent tempered glass sheets by a continuous process in which the sheets S to be treated are moved successively along a predetermined horizontal path through a heating area, a bending area and a tempering area, these areas being contiguous so that a sheet passes immediately from one area to the next succeeding area. To this end, apparatus 20 includes a conveyor system, generally designated 21, adapted to support a plurality of sheets S in a horizontal plane for movement, one-by-one, along a predetermined horizontal path through a heating section 22, a bending section 23, and a tempering section 25, the sections 22, 23 and 25 being disposed end-to-end along such path.

In the illustrative embodiment, the heating section 22 comprises a tunnel-type furnace 26 having a heating chamber 27 defined by a top wall 28, a bottom wall 30 and opposite side walls 31, all formed of a suitable refractory material. The chamber 27 can be heated in any desired manner by suitable heating means, such as gas-fired burners or electrical resistance elements for example (not shown) located in the top and side walls of the furnace 26. The sheets S are advanced through the heated chamber 27 on a series of conveyor rolls 32, which form a part of the conveyor system 21, and extend from the entrance end (not shown) of the furnace 26 to an oppositely disposed exit end. The sheets S are heated to substantially the softening point of the glass during their passage through the chamber 27 and, upon merging through an opening 33 in the exit end of the furnace, are received on a second series of conveyor rolls 35, also a part of the conveyor system 21, which moves the sheets into and within the bending section 23 between a pair of press members, hereinafter identified and more fully described, for imparting the desired curvature to the sheets S.

After bending, the sheets S are advanced along the path on conveyor rolls 35 which move the bent sheets S to and through tempering section 25 wherein their temperature is rapidly reduced to produce the proper temper in the glass. In the illustrative embodiment, the tempering section 25 includes a cooling means comprising upper and lower blastheads 36 disposed above and below the path of movement of the glass sheets and are provided with a series of tubes 37 operable to direct opposed streams of cooling fluid, such as air or the like, toward and against the opposite surfaces of the sheet S moving along such path.

The bending section 23 includes a bending apparatus comprised of an upper male press member 40 and a lower female press member 41 having opposed complemental shaping surfaces conforming to the desired curvature of the sheet to be bent. The press members 40 and 41 are mounted for relative movement toward and away from each other on a structural frame 42, which includes a framework of vertically disposed columns 43 and horizontally extending longitudinal and transverse beams 45 and 46 interconnected and tied together to form a rigid, box-like structure. A base member 47 extends between the upright columns 43 for supporting the female press member 41 and associated parts. The male press member 40 is mounted above the conveyor rolls 35 for vertical reciprocal movement relative to frame 42 while the female press member 41 is located below the conveyor rolls 35 and mounted for vertical reciprocal movement toward and away from the male press member 40.

A pair of laterally spaced locator stops 48 (only one of which is shown in FIG. 1) is positioned in the path of movement of the advancing glass sheets to interrupt movement thereof and accurately position the same in the desired location relative to the press members 40 and 41. Each stop 48 is secured to the distal end of a piston rod 50 of a fluid actuating cylinder 51 mounted on a carriage 52. The cylinders 51 are operative to raise and lower the stops 48 between an upper position above conveyor rolls 35 in the path of an oncoming glass sheet S and a lower position therebeneath.

Figure 3:
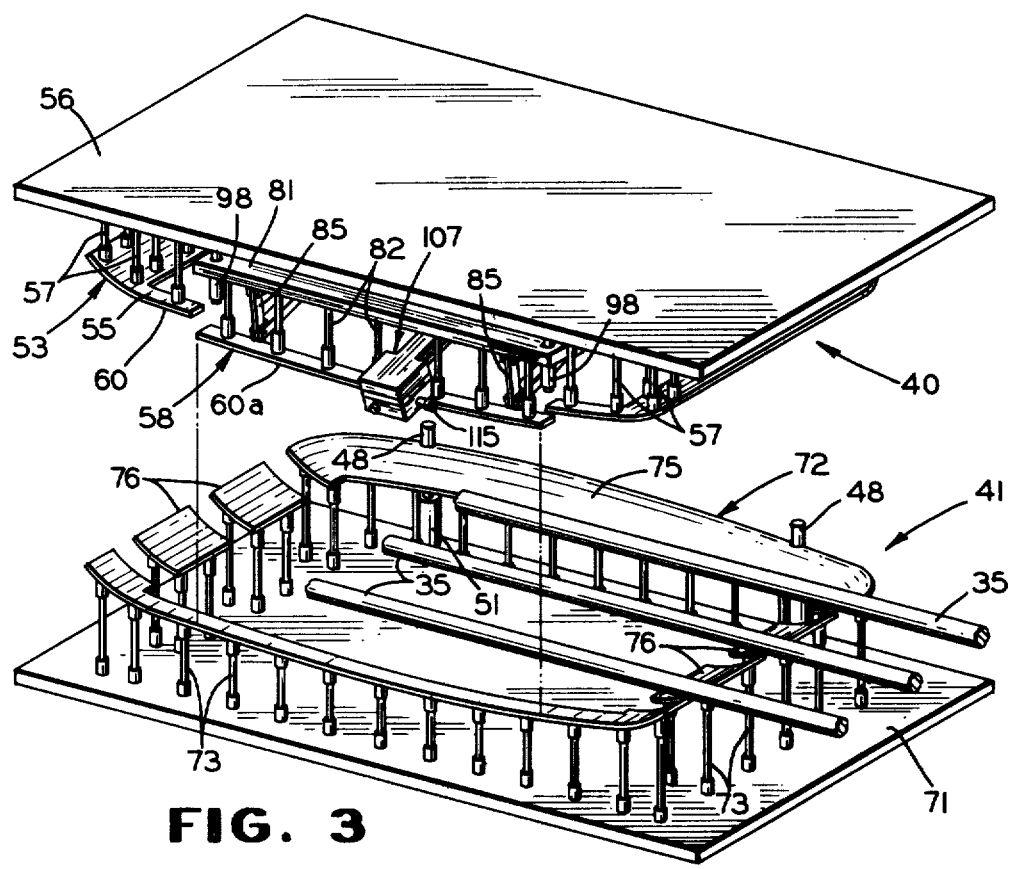
FIG. 3 is a perspective view of the male and female press members shown in an exaggerated, spaced apart relation.

In accordance with this invention, the male press member 40 is of outline or ring-type construction (FIGS. 3 and 4) and comprises a composite shaping rail 53 having a continuous major portion 55 connected to a base plate 56 by a plurality of adjustable connecting rod members 57 and a displaceable portion or segment 58, hereinafter more fully described in detail. The shaping rail 53, including segment 58, conforms in outline to the glass sheets S to be bent and is provided with a downwardly directed, generally convex shaping surface 60 on the lower surface thereof to impart the desired curvature to the sheet. The shaping surface of segment 58 is identified by the reference numeral 60a. However, the particular outline of the composite shaping rail 53, as well as the specific curvature of the shaping surfaces 60 and 60a, is dictated by the desired shape of the glass sheet being bent and can vary widely, as desired.

The means for supporting the upper male press member 40 on frame 42 includes at least one actuating cylinder 61 mounted on one of the upper horizontal beams 45 and having a suitable reciprocal piston (not shown) provided with a piston rod 62 connected at its outer end to a vertically reciprocal platen frame 63. The base plate 56 of the male press member 40 is connected to the platen frame 63 for movement therewith by means of interconnected structural members 65 and 66 and a support plate 67 extending transversely of the platen frame 63. A plurality of guide posts 68 are connected at their lower ends to the four corners of platen frame 63, respectively, and extend upwardly through suitable bushings 70 mounted on upper horizontal beams 46 for sliding movement relative thereto to properly guide platen frame 63 during its vertical reciprocal movement.

The lower female press member 41 also is of outline or ring-type construction and comprises a base plate 71 secured to the carriage 52 and a shaping rail 72 connected to the plate 71 in spaced relation thereto via a series of connecting rod members 73. The shaping rail 72 conforms in outline to the glass sheets S to be bent and is provided on its upper face with a generally concave shaping surface 75 complementary to the male press member shaping surface 60 in opposed relation thereto. To permit displacement of the female shaping rail 72 above the level of the conveyor rolls 35 for lifting the glass sheets thereabove into pressing engagement with the male shaping surface 60, the female rail 72 is formed of a plurality of segments 76 spaced apart from each other a sufficient distance to pass between adjacent rolls 35. As compared to rolls 32, the diameters of rolls 35 are formed relatively small to provide maximum clearance therebetween for the passage of the segments 76 therethrough.

The carriage 52 is supported by a pair of guide members 77 (FIG. 2) and is vertically movable by a fluid cylinder 78 mounted on the base member 47 and provided with a suitable reciprocal piston (not shown) having a piston rod 80 attached at its upper end to carriage 52. The cylinder 78 is operative to raise and lower the lower female press member 41 between its lower position beneath conveyor rolls 35 and its upper position thereabove for lifting a heated glass sheet S from the conveyor rolls 35 and pressing the same against the male press member 40 between the complemental shaping surfaces 60 and 75, thus forming the glass sheet to the desired curvature. After bending, piston rod 80 is retracted to lower the female press member 41 below conveyor rolls 35, depositing the bent sheet thereon for advancement to the tempering section 25.

Prior known conventional press rings have satisfactorily performed their intended function in press shaping glass sheets of symmetrical configurations or designs, including sheets having compound curvatures i.e., radii of curvatures about both the longitudinal and transverse axes. However, attempts to press shape glass sheets of nonsymmetrical curvatures with these conventional known press rings have posed serious problems. This is due to the contoured shaping surfaces of the opposed press rings which must be formed with corresponding nonsymmetrical shaping surfaces. Accordingly, when the flat sheet is lifted by the nonsymmetrical female shaping surface, the sheet tends to drift or slip on the shaping surface toward that side of the surface having the least pronounced curvature. Also, further shifting in the same direction occurs when the sheet makes contact with the upper or male nonsymmetrical shaping surface due to the unequal bending forces applied to the sheet. Of course, such slippage cannot be tolerated because the resultant curvatures of the finally bent product will be offset from their intended curvatures, resulting in improperly shaped finished pieces that must be scrapped.

The present invention addresses this problem by providing means for clamping the glass sheet against the lower shaping surface immediately after the sheet is lifted off the conveyor rolls to preclude any horizontal displacement thereof relative to such shaping surface and/or the opposed press member. To this end, and in accordance with the present invention, the male shaping rail 53 is provided with the hereinbefore mentioned displaceable rail segment 58, which normally is disposed below the level of the major portion 55 of rail 53, to engage the ascending glass sheet prior to contact of the latter with said rail major portion 55.

Figure 4:
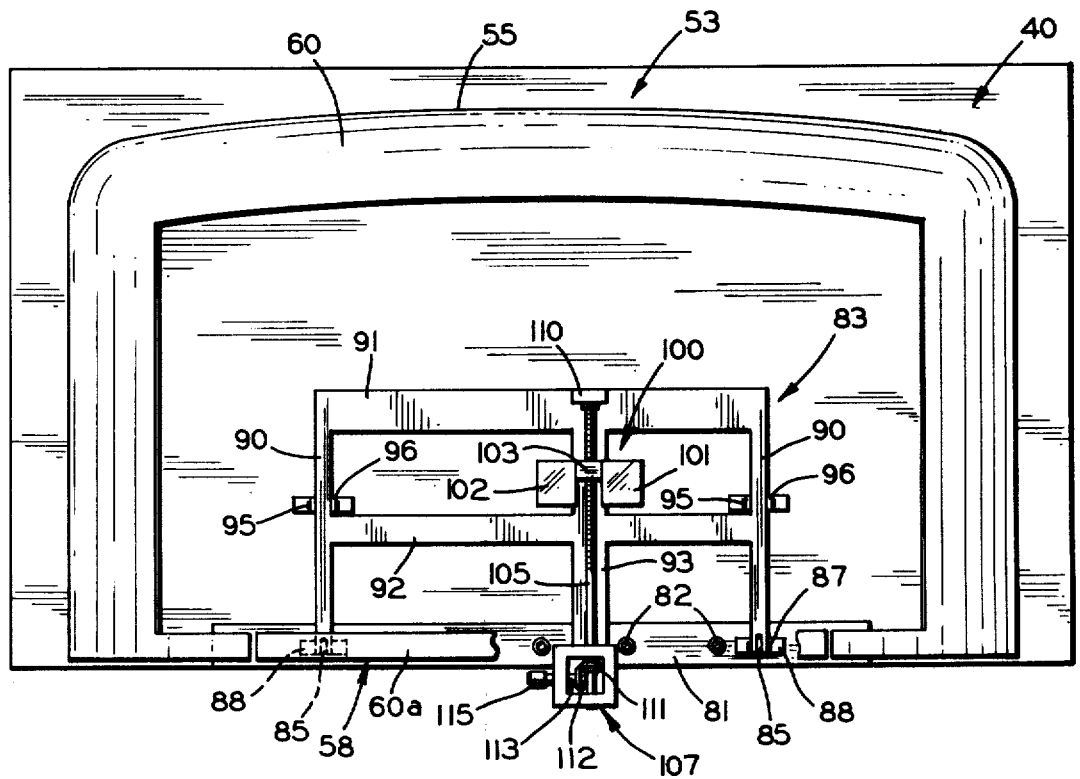
FIG. 4 is an enlarged bottom plan view of the upper male press member.
Figure 5:
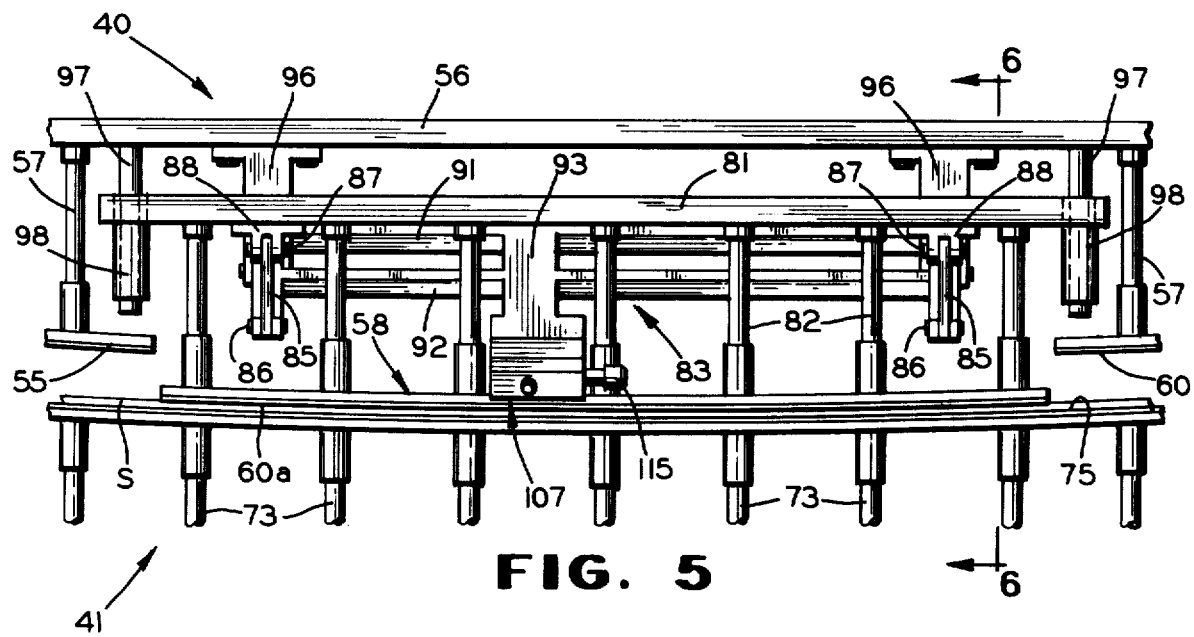
FIG. 5 is an enlarged, fragmentary, front elevational view of the male and female press members, looking in the direction of arrows 5—5 of FIG. 2 and showing a segment of the upper shaping rail in clamping relation against a glass sheet.
Figure 6:
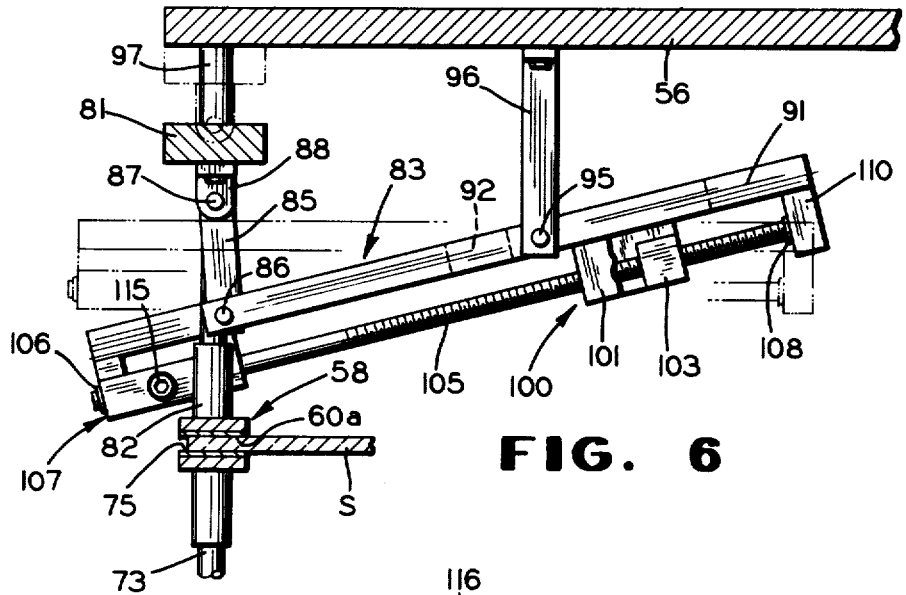
FIG. 6 is a vertical sectional view, on an enlarged scale, taken along the line 6—6 of FIG. 5.

As shown in FIGS. 4-6, the displaceable rail segment 58 is secured to a support bar 81 by means of a plurality of laterally spaced connecting rods 82. The support bar 81 is connected to a pivotal frame, generally designated 83, by means of a pair of laterally spaced links 85 pivotally connected at their lower ends to the frame 83 by pivot pins 86 and pivotally connected at their upper ends, as by pins 87, to clevis members 88 welded or otherwise fixedly secured to the underside of support bar 81.

As best shown in FIG. 4, the frame 83 includes a pair of side members 90, an end member 91, an intermediate member 92 and a transverse cross member 93, all formed integral with each other. The frame 83 is freely suspended for pivotal movement by means of pins 95 pivotally connecting the frame members 90 to posts 96 secured to the underside of base plate 56 and extending downwardly therefrom. The frame 83, as well as support bar 81, is guided for movement in a vertical path by means of guide posts 97 (FIG. 5) rigidly secured to and extending downwardly from the underside of base plate 56 and projecting through guide sleeves 98 mounted on support bar 81.

The cross member 93 of frame 83 carries a counterweight 100 comprised of a pair of blocks 101 and 102 connected by a nut 103 extending therebetween and rigidly secured thereto. The nut 103 is formed with a tapped bore for receiving an elongated screw 105 suitably journalled for rotation at one end in a bearing 106 mounted in a counterweight adjusting device 107 and at the other end in a bearing 108 mounted in a block 110 fixedly secured to the underside of the frame end member 91.

Figure 7:
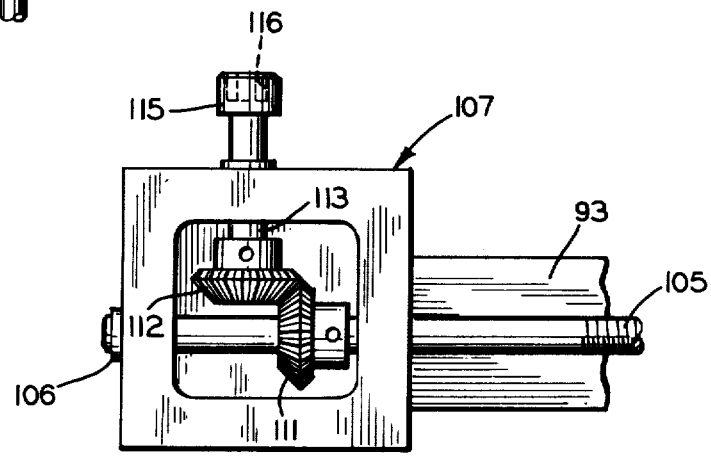
FIG. 7 is an enlarged view of the means for adjusting the displacement of the clamping segment relative to the major portion of the male shaping rail.

The counterweight adjusting device 107 (FIG. 7) includes a beveled gear 111 mounted on screw 105 and meshing with a right angularly related beveled gear 112 mounted on a control shaft 113 projecting through the wall of adjusting device 107 and provided with a head portion 115 having a recess 116 defined by flat-sided walls for the reception of an appropriate tool. Turning the control shaft 113 effects rotation, via gears 112 and 111, of the axially fixed screw 105 to move nut 103 and thereby the counterweight 100 axially along the screw in the direction desired. This permits a fine adjustment of the counterweight 100 axially along screw 105 to freely suspend the shaping segment 58 at any desired elevation. Preferably, the elevation of segment 58 is disposed just slightly above the level of conveyor rolls 35 in order to engage the upwardly moving glass sheet immediately after the latter clears the conveyor rolls 35.

The mode of operation of the apparatus of this invention is as follows:

Glass sheets S are loaded one at a time onto the conveyor rolls 32 at the entrance end (not shown) of the furnace 26 for movement through the heating chamber 27 wherein each sheet S is heated to substantially its softening point or bending temperature. The heated sheet S passes through the furnace end wall opening 33 and is transferred onto conveyor rolls 35 for movement into bending section 23. As the sheet enters the bending section 23, a photocell or other suitable detection device (not shown) initiates activation of a timer (also not shown) controlling operation of the bending cycle. The timing of this control is such that when the lading edge of the glass sheet S engages the stops 48, cylinder 78 is actuated to raise the female press member 41 upwardly to remove the heat-softened sheet S from conveyor rolls 35. Immediately upon clearing the conveyor rolls 35, the upwardly moving sheet engages the shaping surface 60a of the suspended shaping rail segment 58 and is clamped thereby against the shaping surface 75 of the lower shaping rail 72. Thus, the glass sheet S is fixed against lateral slippage or shifting on shaping surface 75 to promote proper registry with the shaping surface 60 of the upper shaping rail 53. The glass sheet continues to move upwardly on the rising female press member 41, carrying the segment 58 therewith, until the clamped sheet S engages the shaping surface 60 of the major portion 55 of shaping rail 53 and is pressed into the desired final shape between the complemental shaping surfaces 60 and 75.

After the glass sheet has been shaped between the press members 40 and 41 to impart the desired curvature thereto, the female press member 41 is lowered, as by means of cylinder 78, below conveyor rolls 35 to deposit the bent sheet thereon for advancement out of the bending section 23 and into the tempering section 25. The segment 58 will also be lowered by gravity until it reaches its predetermined elevation as dictated by the counterweight 100. The bent sheet is advanced by conveyor rolls 35 into and through the tempering section 25 between the opposed tubes 37 of blastheads 36 at a speed promoting a proper rate of cooling to attain the desired temper in the bent sheet.

From the foregoing, it is apparent that the objects of the present invention have been fully accomplished. As a result of this invention, an improved method and apparatus is provided for bending glass sheets having nonsymmetrical curvatures in a manner promoting proper fit or configuration of the finished piece. By the provision of a displaceable glass shaping segment forming a part of the upper press ring, the sheet to be bent is clamped on the lower press ring immediately after clearing the supporting conveyor rolls to avoid any horizontal slippage or shifting of said sheet relative to the opposed press members, thus assuring the desired bends to be formed in their intended locations.

It is to be understood that the form of the invention herewith shown and described is to be taken as an illustrative embodiment only of the same, and that various changes in the shape, size and arrangement of parts, as well as various procedural changes, may be resorted to without departing from the spirit of the invention.

We claim:

1. A method of bending a glass sheet comprising: heating a glass sheet to the softening point thereof, supporting said heated sheet between and in spaced relation to a pair of opposed press members having shaping rails provided with shaping surfaces, providing one of said shaping rails with a major portion and a displaceable portion normally disposed out of the general plane of said major portion toward the other shaping rail, moving said other shaping rail toward said one shaping rail to remove said sheet from said support and carry said sheet into engagement with said displaceable portion, clamping said sheet between said displaceable portion and said other shaping rail to prevent glass movement therebetween before engagement of said sheet with said major portion to impart a final desired shape to said sheet.

2. A method according to claim 1, including moving said displaceable portion along with said glass sheet toward said major portion of said one shaping rail.

3. A method according to claim 1, wherein said heated sheet is supported in a horizontal plane on a conveyor, and moving said other shaping rail upwardly to lift said sheet from said conveyor.

4. A method according to claim 3, wherein said sheet is moved into engagement with said displaceable portion immediately after clearing said conveyor.

5. Apparatus for bending a glass sheet comprising: a frame, means on said frame for supporting a glass sheet, a pair of opposed movable bending members mounted on said frame on opposite sides of said sheet, each of said bending members having an outline shaping rail provided with a shaping surface conforming to the marginal outline of the glass sheet to be bent, one of said shaping rails having a fixed major portion and a displaceable portion normally disposed out of the general plane of said major portion toward the other shaping rail, means for moving said other shaping rail toward said one shaping rail for removing said sheet from said support and carrying said sheet into engagement with said displaceable portion to clamp said sheet therebetween prior to engagement of said sheet against said major portion of said one shaping rail.

6. Apparatus according to claim 5, including a plurality of conveyor rolls mounted on said frame for supporting said glass sheet in a horizontal plane between said opposed bending members, and means for moving said other shaping rail upwardly to lift said sheet off said conveyor rolls into engagement with said displaceable portion and subsequently into engagement with said major portion to effect shaping of said glass sheet.

7. Apparatus according to claim 5, including a movable frame pivotally mounted on said bending member having said one shaping rail, and means mounting said displaceable portion on said movable frame.

8. Apparatus according to claim 7, wherein said displaceable portion is mounted on one end of said movable frame and normally disposed by gravity below the general plane of said major portion of said one shaping rail.

9. Apparatus according to claim 8, including a counterweight on said movable frame adjacent the other end thereof for establishing the normally disposed position of said displaceable portion.

10. Apparatus according to claim 9, including means on said movable frame for adjusting the position of said counterweight on said movable frame and thereby the disposition of said displaceable portion relative to said major portion.

11. Apparatus according to claim 10, wherein said adjusting means includes a nut affixed to said counterweight for movement therewith and an axially fixed screw mounted on said movable frame and threaded into said nut for axially moving said counterweight longitudinally of said screw.

12. Apparatus according to claim 5, including means for adjusting the disposition of said displaceable portion relative to said major portion of said one rail.

* * * * *